United States Patent
Fischer et al.

(10) Patent No.: US 11,155,652 B2
(45) Date of Patent: Oct. 26, 2021

(54) OLEFIN POLYMERIZATION PROCESSES

(71) Applicant: ExxonMobil Chemical Patents Inc., Baytown, TX (US)

(72) Inventors: Jason R. Fischer, Houston, TX (US); David J. Sandell, Sparks, NV (US); Giyarpuram N. Prasad, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/084,294

(22) Filed: Oct. 29, 2020

(65) Prior Publication Data

US 2021/0139618 A1    May 13, 2021

Related U.S. Application Data (60) Provisional application No. 62/932,004, filed on Nov. 7, 2019, provisional application No. 62/932,017, filed on Nov. 7, 2019.

(51) Int. Cl.
*C08F 10/02* (2006.01)
*C08F 2/01* (2006.01)
(Continued)

(52) U.S. Cl.
CPC ............ *C08F 10/02* (2013.01); *C08F 2/01* (2013.01); *C08F 2/34* (2013.01); *C08F 10/06* (2013.01)

(58) Field of Classification Search
CPC .. C08F 6/005; C08F 10/02; C08F 2/34; C08F 2/01; C08F 10/06; C08L 23/04
(Continued)

(56) References Cited

U.S. PATENT DOCUMENTS

| 4,543,399 A | 9/1985 | Jenkins, III et al. |
| 5,089,033 A | 2/1992 | Wijmans |

(Continued)

FOREIGN PATENT DOCUMENTS

| EP | 0571826 A | 2/1997 |
| WO | 20180204026 A1 | 11/2018 |
| WO | 2019099134 A1 | 5/2019 |

OTHER PUBLICATIONS

Duran, et al. (2005), "Flameless Thermal Oxidation for Chlorinated Waste Vent Gas Destruction: A Case History", IT3'05 Conference, May 9-13, 2005, Galveston, TX; 10 pgs.
(Continued)

*Primary Examiner* — William K Cheung
(74) *Attorney, Agent, or Firm* — ExxonMobil Chemical Patents Inc.- Law Department (57) ABSTRACT

In a process for producing an olefin polymer, an olefin monomer is polymerized to produce a particulate polymer product containing unreacted monomer. The polymer product is contacted with an inert gas to strip hydrocarbon impurities therefrom and produce a stripped polymer product and a gaseous first effluent stream containing inert gas and hydrocarbons. The stripped polymer product is recovered and the first effluent stream is compressed and cooled to condense hydrocarbons contained therein and produce a gaseous second effluent stream. Part of the second effluent stream is contacted with a first membrane separator to produce a first hydrocarbon-enriched permeate stream and a first hydrocarbon-depleted residue stream. The first residue stream is contacted with a second membrane separator to produce a second hydrocarbon-enriched permeate stream and a second hydrocarbon-depleted residue stream. The second permeate stream and an oxidizing agent are supplied to a flameless thermal oxidation unit.

16 Claims, 6 Drawing Sheets

(51) Int. Cl.
*C08F 2/34* (2006.01)
*C08F 10/06* (2006.01)

(58) Field of Classification Search
USPC .......................................................... 526/68
See application file for complete search history.

(56) References Cited

U.S. PATENT DOCUMENTS

| | | |
|---|---|---|
| 5,165,884 A | 11/1992 | Martin et al. |
| 5,199,962 A | 4/1993 | Wijmans |
| 5,635,139 A | 6/1997 | Holst et al. |
| 6,306,792 B1 | 10/2001 | Miyake et al. |
| 6,559,348 B1 | 5/2003 | Aittamaa et al. |
| 7,351,779 B2 * | 4/2008 | Iaccino .................. C08F 6/003 526/206 |
| 9,216,931 B1 | 12/2015 | Su |
| 2004/0242810 A1 | 12/2004 | Bell et al. |
| 2005/0033016 A1 | 2/2005 | Marissal et al. |
| 2009/0133854 A1 | 5/2009 | Johnson et al. |
| 2011/0283991 A1 | 11/2011 | Falcone |
| 2014/0283812 A1 | 9/2014 | Irrgang et al. |
| 2016/0096783 A1 | 4/2016 | Mills et al. |
| 2017/0050900 A1 | 2/2017 | Su |
| 2017/0333839 A1 | 11/2017 | Inamdar et al. |
| 2018/0162962 A1 | 6/2018 | Haynie |

OTHER PUBLICATIONS

Huffman, et al. (2001), "Design and Operational Considerations for Rapidly Changing Vent Gas Oxidation", Incineration & Thermal Treatment Tech Conference, May 14-18, 2001, Philadelphia PA; 8 pgs.

* cited by examiner

OLEFIN POLYMERIZATION PROCESSES

CROSS REFERENCE TO RELATED APPLICATIONS

This application claims the benefit of U.S. Provisional application No. 62/932,004, filed Nov. 7, 2019, entitled "Olefin Polymerization Processes" and also claims the benefit of U.S. Provisional application No. 62/932,017, filed on Nov. 7, 2019, entitled "Olefin Polymerization Processes", the entireties of which are incorporated by reference herein.

FIELD

This invention relates to olefin polymerization processes and particularly to gas phase olefin polymerization processes and the treatment of vent gas streams from such processes.

BACKGROUND

Gas phase catalytic polymerization is the predominant technology used to produce polyolefin resins. The catalysts used in the process are contained in solid substrate particles from which the polymer chains grow. Gas phase olefin polymerization technology often employs a fluidized bed, where the particles are fluidized in a fluidized bed by a gas stream also containing the reactants, such as the olefin monomer or monomers. The carrier gas for the catalyst particles is normally an inert gas, especially nitrogen. Processes of this type are described in, for example, EP 0475603A, EP 0089691A and EP 0571826A, which are hereby incorporated by reference.

In gas phase polymerization processes, the polymer particles produced in the fluidized bed are discharged continuously or discontinuously from the reactor and conveyed pneumatically, generally using nitrogen, to a product recovery system. The polymer particles inevitably contain unreacted monomer as well as heavier hydrocarbons added to, or produced in, the polymerization process. For example, the polymer particles may contain saturated homologues of the feed monomers produced by hydrogen supplied to the reactor to control the molecular product of the polymer and/or condensable liquids, such as $C_3$ to $C_6$ alkanes, added to assist in heat removal. Thus, the product recovery system includes a degassing or purging vessel where unreacted monomers and heavier hydrocarbons are stripped from the polymer particles normally by countercurrent contact with a purge gas, typically nitrogen or a mixture of nitrogen with light hydrocarbons having low solubility in the polymer product. The resulting purged gas stream, diluted with unreacted monomer and heavier hydrocarbons is recovered from the purge vessel and, after separation of the hydrocarbon components through various unit operations such as compression, cooling, condensation, permeation, adsorption etc., may be partially returned to the process as the conveying gas or, in another embodiment, as part of the monomer recycle stream.

To limit or avoid build-up of inert components, such as methane, ethane, and particularly nitrogen, as well as other inert species, at least a part of the recycle gas stream must be continuously vented and purged from the system. The vent stream is typically disposed of in a flare (either a ground-based flare or elevated flare), in which the hydrocarbon components are thermally decomposed in the presence of a flame. Alternatively, if the polyolefin plant is conveniently co-located next to an olefins cracker, the vent gas stream can be sent back to the olefins cracker for reprocessing or for use as a fuel gas.

Although flaring is the most common process for decomposing volatile organic compounds (VOCs) in the large scale vents from chemical plants, including polyolefin plants, the use of a flame to cause thermal decomposition of organic compounds often results in the production of objectionable levels of air pollutants such as $NO_x$ and CO. $NO_x$ is produced as a result of localized areas of high temperature and CO is the result of incomplete combustion of the fuel gas that may occur during the combustion process. Moreover, commercial flare systems typically run at a destruction efficiency of 98% (for hydrocarbons $C_3$ chain or longer) to 99% (for hydrocarbons less than $C_3$ chains). This results in 1 to 2% of un-combusted residual VOCs being discharged to atmosphere.

Another known form of thermal oxidation employs a so-called "flameless" thermal oxidation (FTO) process. An example of a flameless oxidation process using a bed matrix of solid heat-resistant material is disclosed in U.S. Pat. No. 5,165,884. In this patent, a mixture of gases or vapors with air and/or oxygen flows into the bed matrix which has been preheated to a temperature above the auto-ignition temperature of the mixture. The mixture ignites and reacts exothermally in the bed matrix to form a self-sustaining reaction wave within the bed matrix. The process minimizes the production of $NO_x$, CO and other products of incomplete combustion. In addition, VOC destruction efficiency of flameless oxidation (99.99 to 99.9999%) vastly exceeds that of steam- and air-assisted flares (typically 99% at best). FTOs have been generally deployed for complete combustion of highly noxious emissions from specialty chemical plants where parts per million quantities are targeted in the effluent, which cannot be achieved through use of conventional flares. They also tend to be smaller in size as the specialty chemicals are usually manufactured in smaller volume plants. One larger scale use of the FTO process is for neutralizing vinyl chloride monomer in a PVC plant.

While flameless thermal oxidation (FTO) is an effective process for purifying vent gas streams from many chemical plants, the process requires a well-regulated air-diluted feed to prevent trips resulting from premature combustion from excessive heating values. Thus most FTO units employ control devices which seek to hold diluted heating value constant based on a calorimeter signal. However, if the compositional variation in the feed becomes excessive, the ability to control the heating value degrades resulting in FTO trips. Such trips normally involve a multi-hour outage before the FTO unit can be restarted as well as an operator visit.

The vent systems from gas phase polyolefin plants are an extreme example of a system having wide variation in flare heating value due to the semi-continuous polymer discharge from the reactor and the organic component of the vent stream being highly calorific. This results in the vent gas composition swinging from lean to very rich every discharge cycle. Until now, this wide variation in vent gas fuel values has prevented FTOs from being used in oxidizing the vent streams from polyolefin plants.

SUMMARY

According to the present invention, it has now been found that a flameless thermal oxidizer can be used with the required very high availability (on-stream time), as the primary destruction device for VOCs in the vent streams from polyolefin plants provided the vent gas handling system is designed to maximize hydrocarbon removal and includes components that introduce a dynamic time lag between heat content changes at the outlet to the monomer stripping vessel and those reaching the FTO unit. Further control can be realized by providing the FTO with a separate and adjustable source of fuel, such as natural gas.

Thus, in one aspect, the invention resides in a process for producing an olefin polymer, the process comprising:

(a) polymerizing at least one olefin monomer in a polymerization reactor to produce a particulate polymer product containing unreacted monomer;

(b) contacting the polymer product with an inert gas-containing stream in a stripping vessel under conditions effective to strip hydrocarbon impurities including unreacted monomer from the polymer product and produce a stripped particulate polymer product and a gaseous first effluent stream containing inert gas and hydrocarbons;

(c) recovering the stripped particulate polymer product;

(d) compressing and cooling the first effluent stream to condense some of the hydrocarbons contained therein and produce a gaseous second effluent stream;

(e) contacting part of the second effluent stream with one or more membrane separators to produce a hydrocarbon-enriched permeate stream and a hydrocarbon-depleted residue stream; and (f) continuously supplying at least part of the permeate stream and an oxidizing agent to a flameless thermal oxidation unit to convert hydrocarbons therein to $CO_2$ and $H_2O$.

In another aspect, the invention resides in a process for producing an olefin polymer, the process comprising:

(a) polymerizing at least one olefin monomer in a polymerization reactor to produce a particulate polymer product containing unreacted monomer;

(b) contacting the polymer product with an inert gas-containing stream in a stripping vessel under conditions effective to strip hydrocarbon impurities including unreacted monomer from the polymer product and produce a stripped particulate polymer product and a gaseous first effluent stream containing inert gas and hydrocarbons;

(c) recovering the stripped particulate polymer product;

(d) compressing and cooling the first effluent stream to condense some of the hydrocarbons contained therein and produce a gaseous second effluent stream;

(e) contacting at least part of the second effluent stream with a first membrane separator to produce a first permeate stream enriched in hydrocarbons as compared to the second effluent stream and a first residue stream depleted in hydrocarbons as compared to the second effluent stream;

(f) contacting at least part of the first residue stream with a second membrane separator to produce a second permeate stream enriched in hydrocarbons as compared to the first residue stream and a second residue stream depleted in hydrocarbons as compared to the first residue stream; and (g) continuously supplying at least part of the second permeate stream and an oxidizing agent to a flameless thermal oxidation unit to convert hydrocarbons therein to $CO_2$ and $H_2O$.

DETAILED DESCRIPTION OF THE EMBODIMENTS

In various aspects, the present disclosure describes methodology to allow the vent stream from a polyolefin plant, which would normally be flared, to be directed to a very high efficiency combustion device, such as a flameless thermal oxidizer (FTO) (resulting in 99.99 to 99.9999% destruction of VOCs in the incoming feed and <0.01% of uncombusted VOCs being released to atmosphere), while allowing high availability of on-stream operation. Normally FTOs are prone to trips/shutdowns as they do not handle sudden changes in the heat content of the vent stream as typically is the case in polyolefin plants. It has now been found that providing a dynamic lag between heat content changes at the outlet to the monomer stripping vessel and those present in the feed to the FTO is an important condition for stable FTO operation, allowing its required high availability as the primary disposition mechanism for the continuous hydrocarbon-containing vents present in a polyolefin plant.

The dynamic lag in heat content may be achieved by effecting one or more of (a) utilizing surge volume present in the system vessels and other equipment (either based on existing or upgraded designs); (b) providing recycle mixing of a portion of the processing stream to allow back-mixing of fresh feed stream thereby diluting the impact of sudden increases in heat content of the fresh feed; (c) leveraging the inherent time constant of permeation through membrane separators which further dampens the changes in composition (of hydrocarbon-containing permeate) as fed to the FTO; and (d) base loading the FTO by adding natural gas as additional hydrocarbon fuel, which can be decreased in the case of sudden shift in heat content of the feed gas to FTO. These strategies result in moderating the variability in hydrocarbon fuel concentration that would otherwise render the sensitive FTO to frequent trips, to operate steadily and to respond with its controls (air flow rate changes, natural gas supplemental changes). This also obviates the need for feed forward control devices such as a very fast response analyzer to be installed in the feed to the FTO. In some cases, the FTO may be the sole VOC combustion device, but in other cases a conventional flare may also be available in case of emergencies.

For instance, expanding upon (c) as just noted, the vent stream from the product recovery system normally destined to the flare may be permeated through a membrane separator. In this way, fluctuations in the hydrocarbon content of the vent stream (which would normally manifest as sudden and rapid changes in the heat content of feed to the flare) can be significantly reduced. The absorption of hydrocarbons in the vent stream into the membrane, the transportation of hydrocarbons across the membrane, and their desorption inside the membrane may result in the desired time lag between heat content changes at the outlet to the monomer stripping vessel and those present in the permeate from the membrane separator. By combining this membrane separation with a vent gas handling system designed to maximize hydrocarbon removal from the vent stream, the FTO can be used as the primary destruction device for VOCs in the vent streams from polyolefin plants, even gas phase polyolefin plants, while allowing high availability of on-stream operation.

In various embodiments, then, the present disclosure provides a process for producing an olefin polymer, in which at least one olefin monomer, such as ethylene, propylene or a mixture of both, is polymerized in a polymerization reactor, such as a gas phase fluidized bed reactor, to produce a particulate polymer product containing unreacted monomer. In some embodiments, the polymer product may also may contain other hydrocarbon impurities, such as the saturated homologues of the feed monomers produced by hydrogen supplied to the polymerization reactor to control the molecular product of the polymer and/or condensable liquids, such as $C_3$ to $C_6$ alkanes, added to assist in heat removal.

After removal from the polymerization reactor, the polymer product is conveyed, typically by a stream of "assist gas" which is normally nitrogen-rich, into a stripping vessel, where unreacted monomers and heavier hydrocarbons are stripped from the polymer particles normally by contact with a stripping gas. The requisite stripping may be accomplished by blowing a stream largely consisting of an inert gas, normally nitrogen, potentially with recovered light gases, counter-currently up from the bottom of the stripping vessel through the polymer flowing down from the top of the vessel. This flushes out entrained reactor gas and strips and desorbs dissolved hydrocarbons out of the product powder. The polymer product may then be removed for further purification and treatment.

The gaseous effluent exiting the stripping vessel contains the inert stripping gas together with the unreacted monomers and other hydrocarbons stripped from the polymer product. This gaseous effluent is then compressed and cooled, which steps can be conducted in any order, to condense some of the hydrocarbons contained therein and produce a gaseous second effluent stream having a lower hydrocarbon content than the initial effluent stream exiting the stripping vessel. The condensed liquid hydrocarbons may then be recycled to the polymerization reactor, whereas the second effluent stream may be employed as part of the inert stripping gas and or to assist in conveying the polymer product from the reactor to the stripping vessel.

To avoid build-up of inert components, such as methane, ethane and particularly nitrogen, as well as other heavy inert species, part of the second effluent stream is continuously vented and purged from the system. In the present process, purging of part of the second effluent stream involves initially contacting the purge stream with one or membrane separators to produce a hydrocarbon-enriched permeate stream and a hydrocarbon-depleted residue stream. At least part of the permeate stream is then supplied, together with an oxidizing agent, such as air, to a flameless thermal oxidation unit where hydrocarbons in the permeate stream are converted to $CO_2$ and $H_2O$. The conversion product of the FTO unit can then be safely released to the atmosphere. The residue stream can be recycled to the stripping vessel to assist in removal of hydrocarbons contained in the polymer product.

In one particular embodiments, the membrane separation system includes at least a first membrane separator. In certain of these embodiments, the membrane separation system includes at least a first and a second membrane separator. In such embodiments involving at least two membrane separators, part of the second effluent stream is contacted with the first membrane separator to separate the purge stream into the first permeate stream enriched in hydrocarbons as compared to the second effluent stream and a first residue stream depleted in hydrocarbons as compared to the second effluent stream. The first permeate stream can then be recycled to any convenient stage of the process, for example to the gaseous stream flowing from the stripping vessel to the compression and cooling stage. Part or all of the first residue stream is then contacted with a second membrane separator to separate the first residue stream into a second permeate stream enriched in hydrocarbons as compared to the first residue stream and a second residue stream depleted in hydrocarbons as compared to the first residue stream. At least part of the second permeate stream (or all of the second permeate stream) is then supplied (optionally together with an oxidizing agent, such as air) to the FTO unit where hydrocarbons in the second permeate stream are converted to $CO_2$ and $H_2O$. The conversion product of the FTO unit may in some instances then be released to the atmosphere. The second residue stream can be recycled to the stripping vessel. In some instances, it may assist in removal of hydrocarbons contained in the polymer product.

Each membrane separation step employed in the present process involves passing a gas stream containing at least first and second different components across a membrane that is selectively permeable to the first but not the second component. The first component, in this case hydrocarbons in the feed, is therefore concentrated in the stream permeating the membrane, while the residue, non-permeating, stream is correspondingly depleted in first component. The driving force for permeation across the membrane is the partial pressure of the first component, as expressed in the following equation:

$$Fi = Ki \times \text{Area} \times (Pi,\text{residue} - Pi,\text{surface}),$$

where:
Fi=Permeation flow of component i through the membrane (std volume/time)
Ki=Permeability constant of component i (volume/[area*time*pressure])
Area=Effective permeable area of the membrane
Pi=Partial pressure of component i.

Each membrane separator step may be configured in many possible ways, and may include a single membrane unit or an array of two or more units in series or cascade arrangements. Eighty to 90% or above removal of the first component of the feed to the membrane system can typically be achieved with an appropriately designed membrane separation process, leaving a residue stream containing only traces of the first component. The permeate stream is typically concentrated 5- to 100-fold compared with the feedstream. Suitable membrane separation devices for use in the present process are disclosed in U.S. Pat. Nos. 5,089,033 and 5,199,962, the entire disclosures of which are incorporated herein by reference.

A suitable FTO unit for use in the present process is disclosed in US Patent Publication No. 2011/0283991 and comprises a containment vessel housing a matrix bed of inert, refractive media, such as ceramic balls or saddles, and a diptube assembly at least partially positioned within the matrix bed. The diptube assembly includes a fuel conduit for carrying fuel at least partially positioned within the matrix bed; an oxidizing agent conduit for carrying oxidizing agent at least partially positioned within the matrix bed and at least one mixing conduit at least partially positioned within the matrix bed and configured to receive and combine fuel from the fuel conduit and oxidizing agent from the oxidizing agent conduit and to deliver the combination of fuel and oxidizing agent into the matrix bed of media. Similar FTO units are disclosed in US Patent Publication Nos. 2014/0283812 and 2017/0333839. The entire disclosures of all three of the publications mentioned in this paragraph are incorporated herein by reference.

When used in the present process, the FTO feed typically comprises a permeate stream (e.g., from the membrane separation system) as the primary fuel, a combustion air stream as the oxidizing agent and, in some cases, a natural gas stream as a secondary fuel. Vent streams from other parts of the polymerization process, for example, from the unreacted monomer recycle loop and from the condensed liquid hydrocarbon stream recycled from the stripping vessel to the polymerization reactor, may also be part of the fuel supplied to the FTO system. These streams all mix together in the dip tube to form the total combined-feed stream. The FTO controls manipulate combustion air and/or natural gas to achieve the heating value target. Increased air lowers the heating value, and increased natural gas increases the heating value. Generally, the FTO controls are adjusted so that the total combined-feed heating value to the matrix bed of the FTO unit is about 80% of the Lower Flammability Limit (LFL), which is defined as the lower end of the concentration range over which a flammable mixture of gas or vapor in air can be ignited at a given temperature and pressure.

In some embodiments, the permeate stream from the membrane separation system, optionally together with the vent streams from other parts of the polymerization process, is compressed in a flare gas compressor before being supplied to the FTO and optional flare. A portion of the flare gas compressor discharge may then be removed and recycled back to the suction side of the compressor, optionally through a cooler. By adjusting the recycle flow, for example, by means of a pressure controller, the compressor discharge can be maintained at a constant pressure despite pressure fluctuations in the feed to the compressor.

Figure 1:
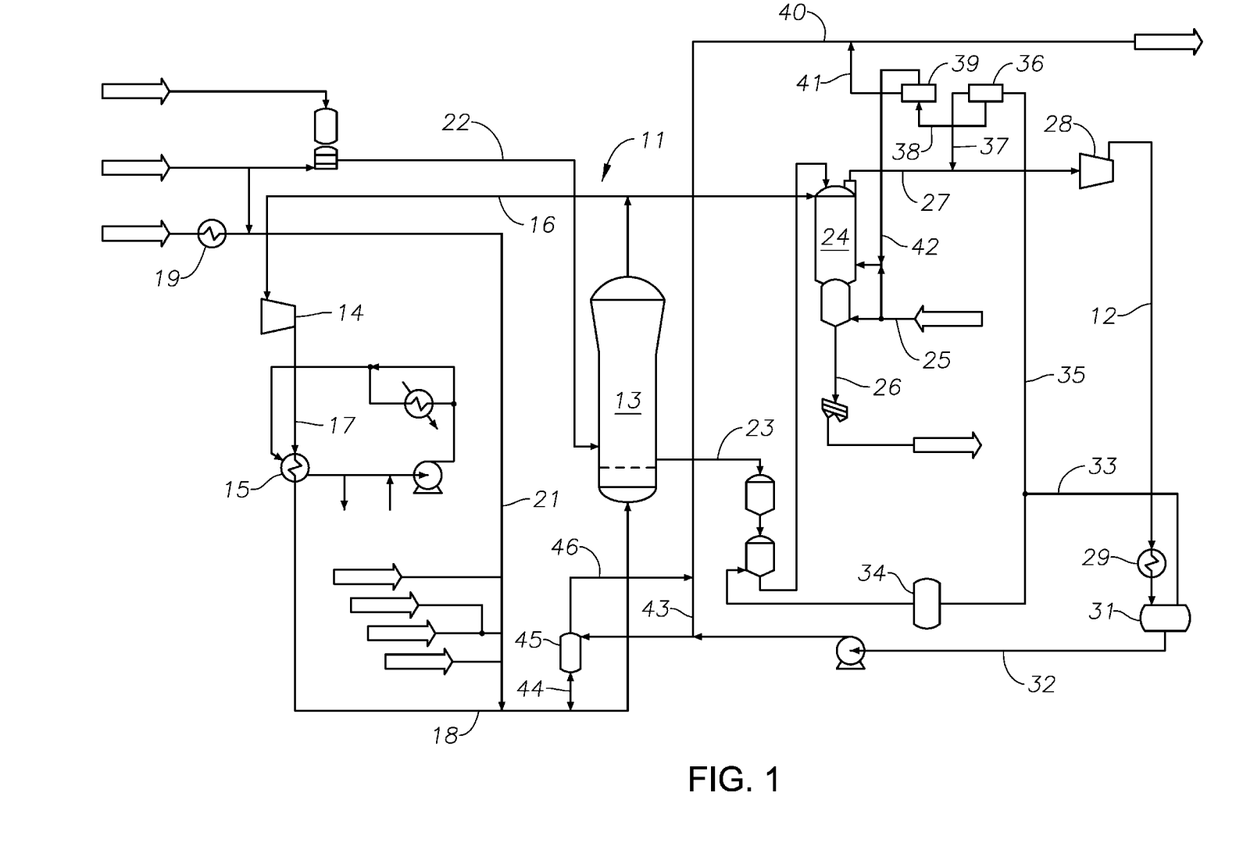
FIG. 1 is a simplified flow diagram of a gas phase ethylene polymerization process according to one embodiment of the invention.

One embodiment of a gas phase ethylene polymerization process according to the present disclosure is shown in FIG. 1 and includes a polymer production loop 11 and a polymer recovery loop 12. Connected in series within the polymer production loop 11 are a fluidized bed reactor 13, a cycle gas compressor 14 and a cycle gas cooler 15. The outlet from the reactor 13 is connected by line 16 to the low pressure side of the compressor 14, whose high pressure side is connected via line 17 to the high temperature side of the cooler 15. The low temperature side of the cooler 15 is connected via line 18 to the inlet of the reactor 13.

Fresh ethylene from a pipeline or storage, optionally after heating by a heat exchanger 19, is supplied by line 21 to be mixed with cooled recycled ethylene in line 18 before being introduced into the reactor 13. Also supplied to the reactor 13 via line 18 may be one or more $C_3$ to $C_6$ alkanes to assist in heat removal and hydrogen to control the degree of polymerization. Nitrogen as a carrier gas for the polymerization catalyst and for fluidizing the growing polymer particles in the reactor is mixed with fresh catalyst from storage and supplied to the reactor 13 via line 22.

Polymer product is discharged continuously from the reactor 13 and fed pneumatically via line 23 to a monomer stripping vessel 24 in the polymer recovery loop 12. The polymer product enters the top of the vessel 24 and, as it flows downwardly through the vessel 24, is contacted with fresh and recycled nitrogen stripping gas supplied to the bottom of the vessel via line 25. The countercurrent contact between the polymer product and the stripping gas flushes out reactor gas entrained in the polymer product and strips and desorbs hydrocarbons, including unreacted monomer, dissolved in the polymer product powder.

The stripped polymer product exits the bottom of the vessel 24 and is fed via line 26 and is fed to a finishing section (not shown), whereas the hydrocarbon-containing stripping gas effluent exits the top of the vessel 24 and is fed via line 27 to the low pressure side of a recovery compressor 28. The high pressure side of the compressor 28 is connected to a condenser 29 where some of the hydrocarbons contained in the compressed stripping gas effluent are cooled and condensed. The condensed liquid is then recovered in a condensed liquids drum 31 before being recycled to the polymer production loop 11 via line 32.

The gaseous component of the stripping gas effluent remaining after passage through the condenser 29 is fed by line 33 to a split where a minor part is removed and, after passage through a surge tank 34, is recycled to line 23 to assist in conveying the polymer product from the reactor 13 to the stripping vessel 24. The remainder of the stripping gas effluent in line 33 is fed by line 35 to the feed side of a first membrane separator 36 where the effluent is separated into a first permeate stream enriched in hydrocarbons as compared to the effluent in line 35 and a first residue stream depleted in hydrocarbons as compared to the effluent in line 35. The first permeate stream is recovered in line 37 and recycled to the compressor 28, while the first residue stream is supplied by line 38 to the feed side of a second membrane separator 39 where the first residue stream is separated into a second permeate stream 41 enriched in hydrocarbons as compared to the first residue stream and a second residue stream 42 depleted in hydrocarbons as compared to the first residue stream. The second permeate stream 41 is supplied by line 40 to a vent gas combustion system (e.g., an FTO device) (not shown in FIG. 1) before being released to atmosphere, whereas the second residue stream 42 is supplied to line 25 to assist in stripping the polymer product.

In addition to the second permeate stream 41, which constitutes the major component of the feed to the vent gas combustion system (e.g., FTO device), the line 40 receives a heavies vent stream 43 (containing $C_6+$ hydrocarbons) from the condensed liquid in line 32 and a lights vent stream 44 (containing nitrogen) from the production recycle loop 11. In the embodiment shown, the vent stream 44 is removed from line 18 and passed upwardly through a packed column 45 to contact condensed liquid from line 32 flowing downwardly through the vent column 45. In this way, unreacted ethylene is stripped from the vent stream 44 and returned to the production loop 11 leaving an ethylene-depleted vent stream which flows out of the top of the column 45 through line 46 to mix with the heavies vent stream 43. The combined stream is then supplied by line 40 to the vent gas combustion system (e.g., FTO device).

Figure 2:
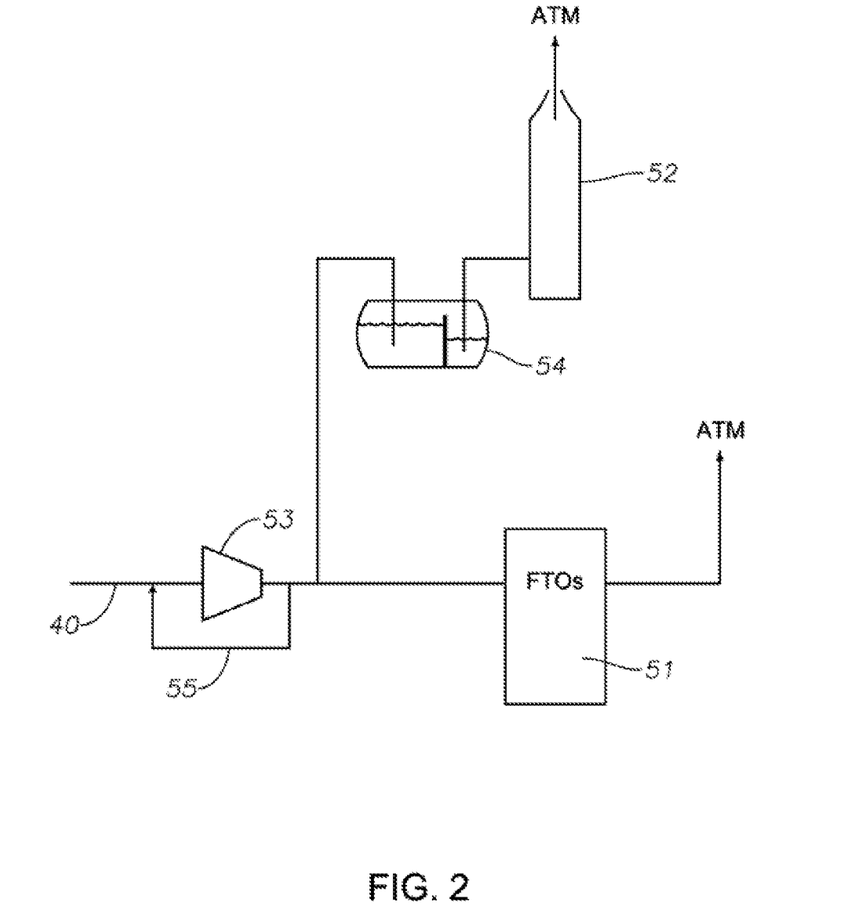
FIG. 2 is a schematic diagram of a vent gas combustion system of the process of FIG. 1 employing a combination of a flameless thermal oxidation unit and a flare.

FIG. 2 illustrates a suitable vent gas combustion system for the process of FIG. 1 comprising a combination of one or more FTO units 51 and a flare 52. In the embodiment shown in FIG. 2, the combined vent gas stream in line 40 is fed to the suction side of a compressor 53 where the pressure of the vent gas is increased to the desired operating pressure of the FTO units 51 which are connected to the output side of the compressor 53. Also connected to the output side of the compressor 53 is a water-filled seal drum 54 which in turn is connected to the flare 52. The level of water in the seal drum is arranged so that, in the event that the pressure at the output side of compressor 53 exceeds a predetermined maximum, the drum 54 allows passage of the vent gas to the flare 52. Part of the discharge from the compressor 53 is fed back to the suction side of the compressor, optionally through a cooler (not shown), via a recycle line 55. A pressure controller may be provided to regulate the flow through line 55 so that the pressure of the compressor discharge can be maintained at a constant value despite pressure fluctuations in the feed to the compressor in line 40.

The invention will now be more particularly described with reference to the following non-limiting Examples and FIGS. 3 to 6 of the accompanying drawings.

Example 1

A test was conducted on a gas phase polyethylene plant as shown in FIG. 1, with FTO per FIG. 2, in which the FTO unit was connected to a flare via a water-filled seal tank set to pass vent gas to the flare in the event that the vent gas pressure exceeded a set amount, in this case 0.87 psig. For the purpose of the test, to eliminate the complexity of having recycle streams and the possibility that any smoothing of vent gas composition takes place because of such recycle, the second residue stream 42 was combined with the second permeate stream 41 immediately downstream of the second membrane separator 39 and the resultant combined stream was fed to the FTO unit.

Figure 3:
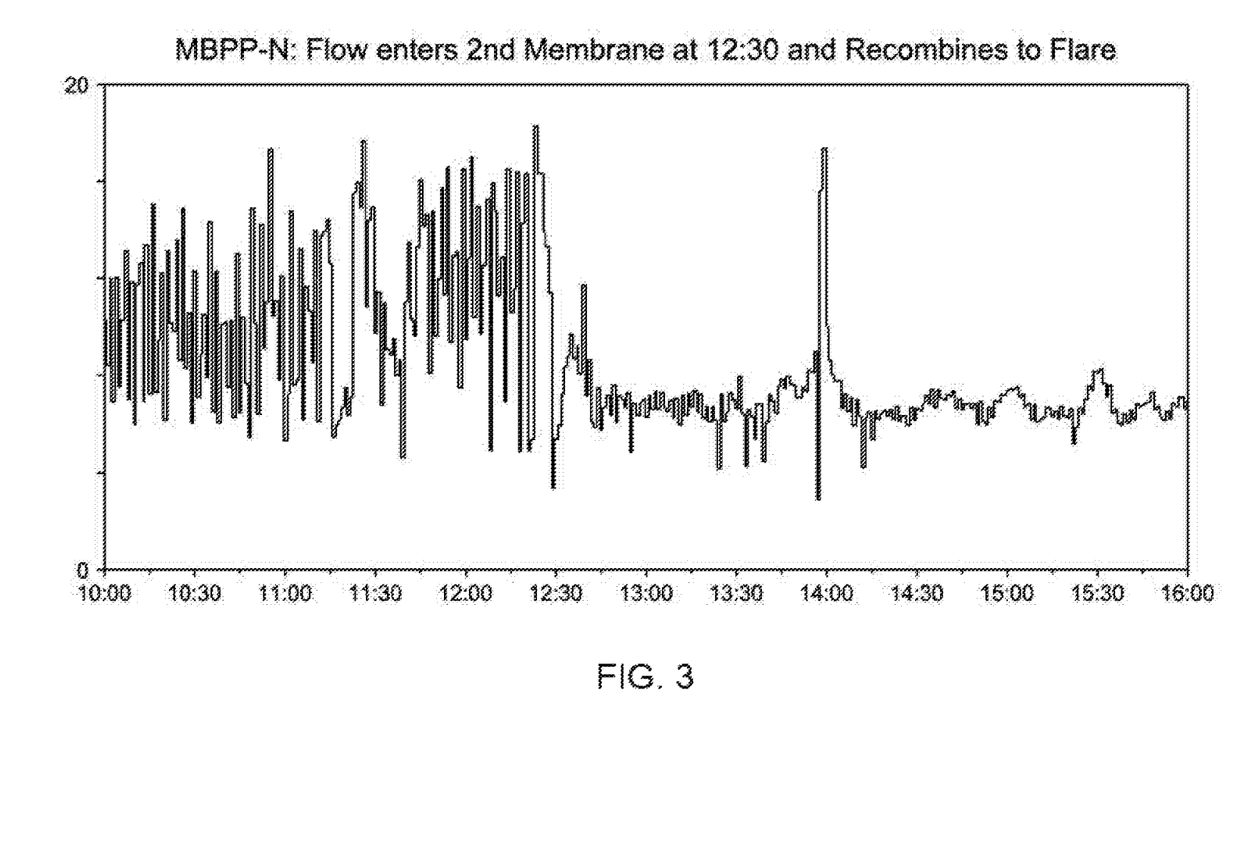
FIG. 3 is a graph of flare header pressure against time for the vent gas combustion stage of the process shown in FIG. 1.

The test was run from 10.00 hours on a given day to 16.00 hours on the same day, with the second membrane separator 39 being by-passed until 12.30 hours when the first residue stream 38 was switched from feeding the FTO/flare combination to feeding the separator 39. The resulting variations in the flare header pressure are shown in FIG. 3, in which it will be seen that the switch of the first residue stream 38 to the second membrane separator 39 led to immediate stabilization of the flare header pressure.

It is to be understood that there was an assignable cause unrelated to the present invention for the high pressure spike just before 14:00. It is also to be understood that the header pressure in this Example cannot rise above 0.87 psig due to the seal drum passing gas at this pressure; in other words variations that would have exceeded that level get truncated in FIG. 3.

Examples 2 and 3

Examples 2 and 3 include simulation results for the production of two polyethylene products (A & B) using the process of FIGS. 1 and 2 where the heat content of the vent streams is modulated to a dilute and manageable heat content value (BTU/scf) such that the heat duty (BTU/hr) changes less for larger changes in volumetric flow rate, which is typical for the polymerization process. This is achieved through a series of unit operations, that result in a stream with more diluted hydrocarbon content and by keeping this stream separate and as the predominant feed to the FTO any rapid changes to the heat content to FTO is moderated.

Example-2: Polyethylene Product-A

| Stream Description | Feed from Purger | Recovered liquids to Reactor | Vapor to membrane Feed | Vent to LP header ($2^{nd}$ stage membrane - permeate) Stream fed to FTO |
|---|---|---|---|---|
| Mass flow rate (lb/hr) | 23,790 | 17,360 | 10,650 | 3,580 |
| Phase (all compositions in mole %) | Vapor | Liquid | Vapor | Vapor |
| H2 (% molar) | 2.3% | 0.0% | 4.4% | 6.4% |
| N2 | 31.9% | 1.0% | 51.8% | 62.9% |
| ETHENE | 15.3% | 10.6% | 34.5% | 27.0% |
| ETHANE | 1.8% | 1.8% | 3.1% | 2.3% |
| 2MPROPANE | 0.6% | 1.0% | 0.2% | 0.0% |
| BUTENE1 | 17.6% | 31.0% | 3.7% | 0.9% |
| BUTANE | 4.8% | 8.5% | 0.9% | 0.2% |
| 2MBUTANE | 17.0% | 30.5% | 1.1% | 0.1% |
| PENTANE | 8.7% | 15.7% | 0.4% | 0.0% |
| HEXENE1 | 0.0% | 0.0% | 0.0% | 0.0% |
| CISHEXENE2 | 0.0% | 0.0% | 0.0% | 0.0% |
| HEXANE | 0.0% | 0.0% | 0.0% | 0.0% |
| Heat content, BTU/scf | >1000 | >1500 | >400 | <250 |

Example-3: Polyethylene Product-B

| Stream Description | Feed from Purger | Recovered liquids to Reactor | Vapor to membrane Feed | Vent to LP header ($2^{nd}$ stage membrane - permeate) Stream fed to FTO |
|---|---|---|---|---|
| Mass flow rate (lb/hr) | 27,770 | 18,470 | 15,870 | 5870 |
| Phase (all compositions in mole %) | Vapor | Liquid | Vapor | Vapor |
| H2 | 0.0% | 0.0% | 0.0% | 0.0% |
| N2 | 38.3% | 0.9% | 50.3% | 61.7% |
| ETHENE | 21.4% | 13.0% | 46.0% | 36.9% |
| ETHANE | 0.5% | 0.4% | 0.7% | 0.6% |
| 2MPROPANE | 0.3% | 0.6% | 0.1% | 0.0% |
| BUTENE1 | 0.0% | 0.0% | 0.0% | 0.0% |
| BUTANE | 3.1% | 6.4% | 0.6% | 0.2% |
| 2MBUTANE | 23.9% | 51.5% | 1.8% | 0.5% |
| PENTANE | 7.9% | 17.10% | 0.4% | 0.1% |
| HEXENE1 | 2.7% | 5.8% | 0.0% | 0.0% |
| CISHEXENE2 | 0.8% | 1.8% | 0.0% | 0.0% |
| HEXANE | 1.2% | 2.5% | 0.0% | 0.0% |
| Heat content, BTU/scf | >1100 | >1600 | >500 | <350 |

Example 4

Figure 4:
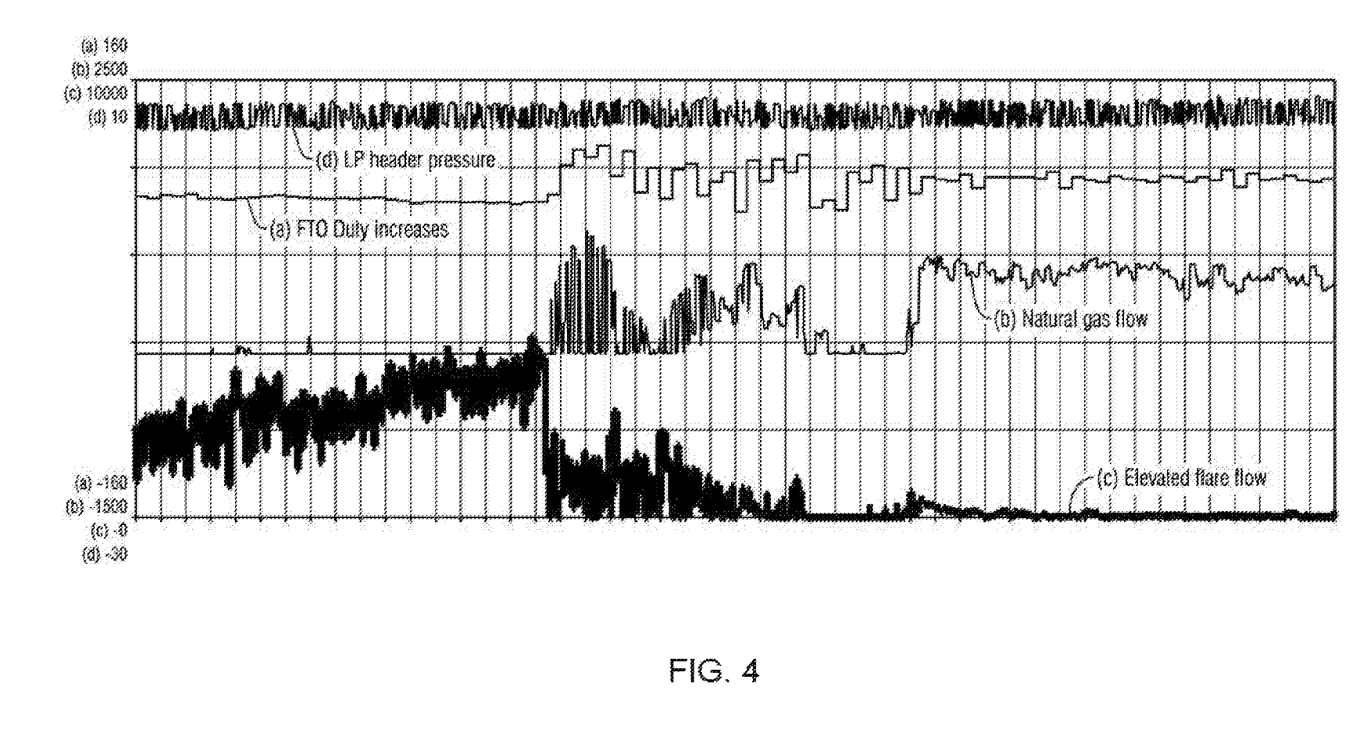
FIG. 4 is a graph showing changes with time of the vent gas and natural gas flow to the FTO unit, the vent gas flow to the elevated flare and the LP header pressure of the process shown in FIGS. 1 and 2 when the FTO unit is brought on line.

In this Example, which is summarized in FIG. 3, the FTO duty of the polymerization process shown in FIGS. 1 and 2 is increased gradually as the FTO is brought online to take more of the flare gas (see line [a] in FIG. 4). Natural gas (see line [b] in FIG. 4) is added to FTO base load heating value which allows better control of the feed fluctuation (natural gas can be cut-back rapidly in case of a hydrocarbon spike in the feed). It will be seen that this operation results in zero flow to the elevated flare (see line [c] in FIG. 4) and a steady LP header pressure (see line [d] in FIG. 4).

Example 5

Figure 5:
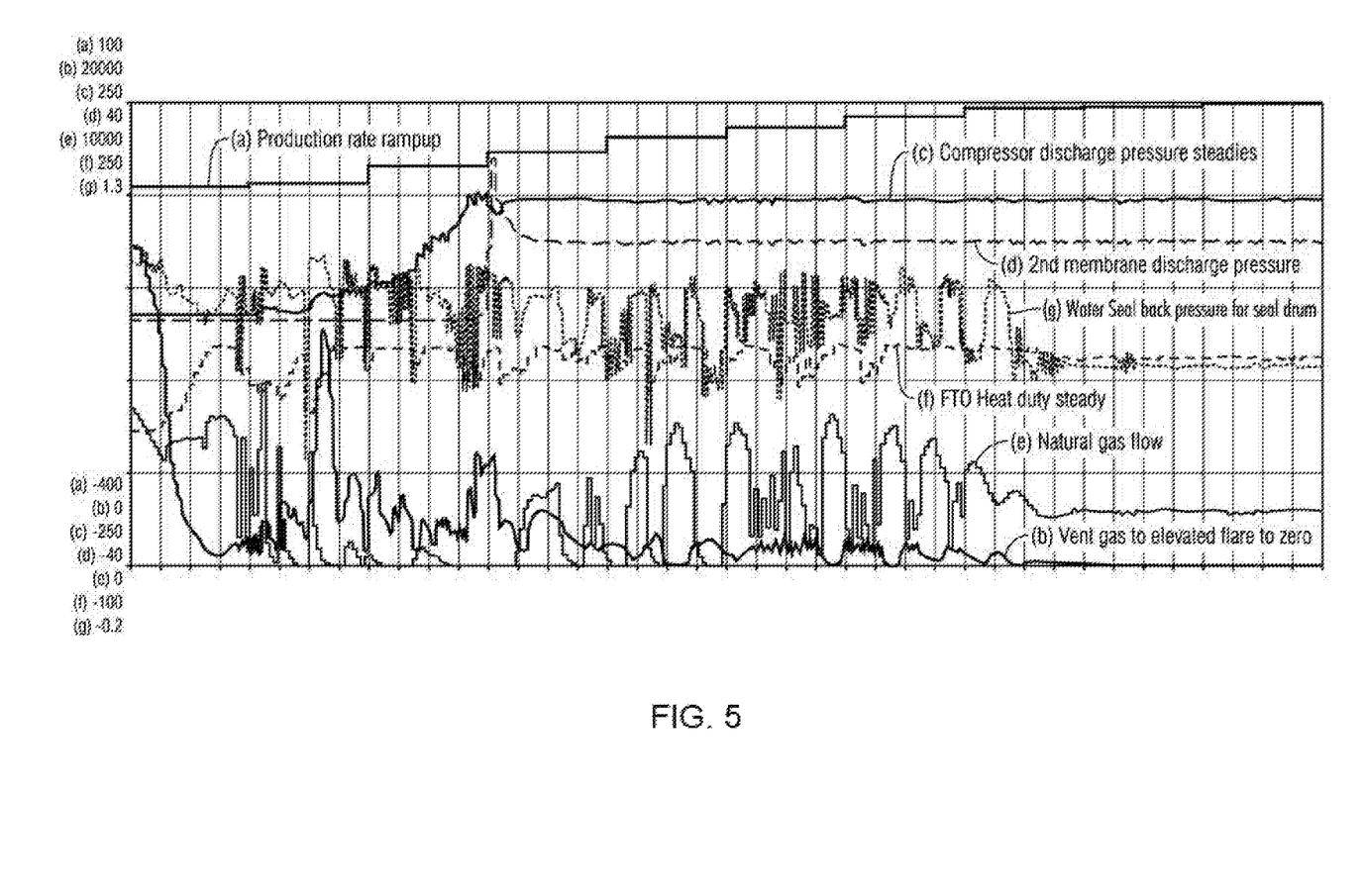
FIG. 5 is a graph showing changes with time of the vent gas flow to the elevated flare, the vent gas compressor discharge pressure, the pressure on the second membrane separator, and the heating value to the FTO unit during start-up of ethylene supply to the process shown in FIGS. 1 and 2.

In this example, which is summarized in FIG. 5, illustration of a start-up of the polymerization process shown in FIGS. 1 and 2 is provided with production rate being ramped up in stair-steps (see line [a] in FIG. 5). It will be seen that within 4 hours of the start-up, initial vent gas flow to the elevated flare (see line [b] in FIG. 5) is decreased; steady flow through the membrane recovery system is established as illustrated by constant vent gas compressor discharge pressure (see line [c] in FIG. 5) and steady pressure on the second membrane separator (see line [d] in FIG. 5). Natural gas (see line [e] in FIG. 5) is used to steady heating value to the FTO—flow is oscillatory initially as natural gas compensates for fluctuations in process gas vents, but as the recovery system lines out, FTO feed heat content is steady as measured by BTU control (see line [f] in FIG. 5) to take all vent gases by 04:00 hours. The elevated flare is fully offline as indicated by low and steady water back pressure from the seal drum 54 starting at 03:45 (see line [g] in FIG. 5).

Example 6

Figure 6:
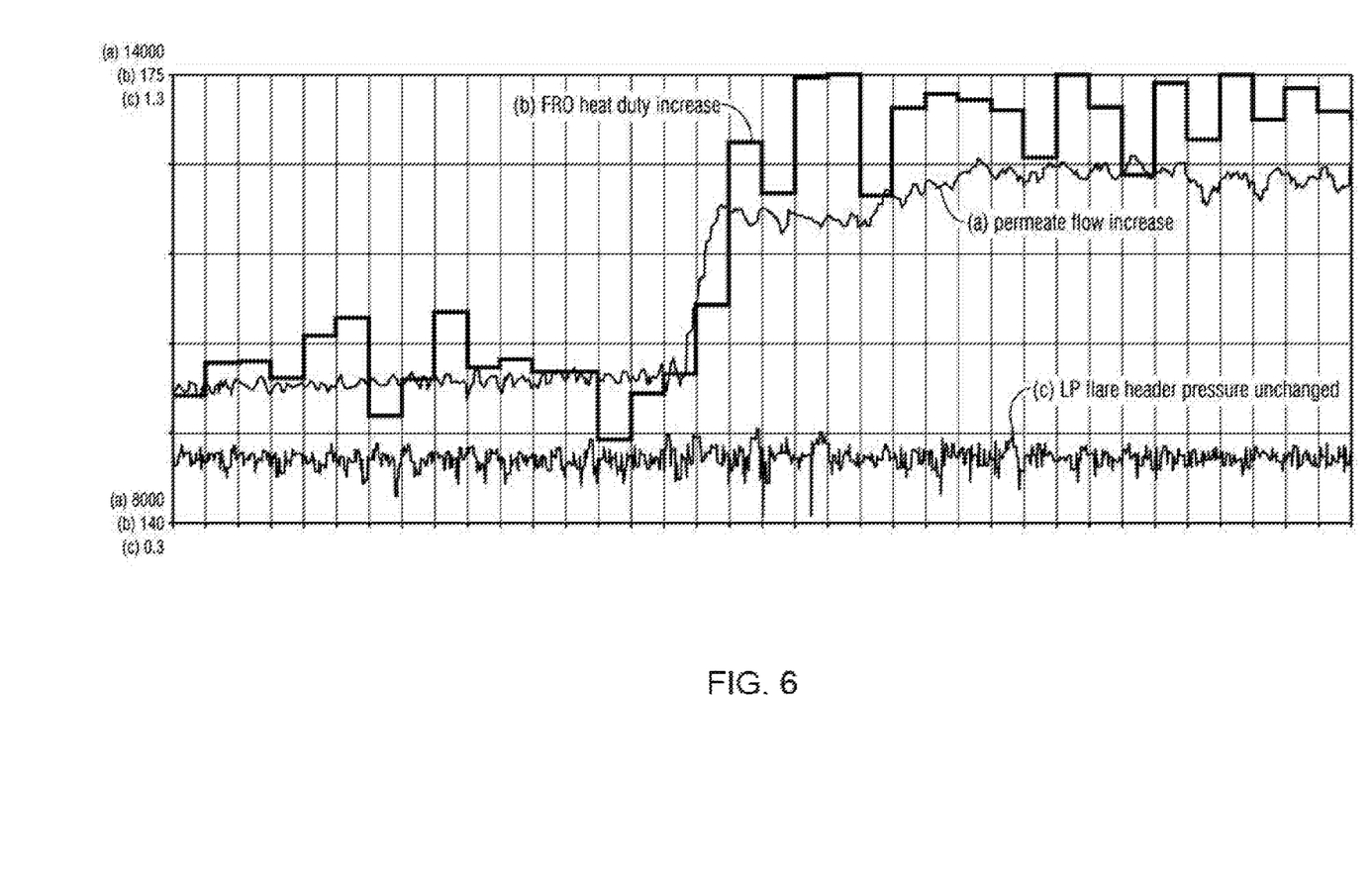
FIG. 6 is a graph showing changes with time of the permeate flow to the LP flare header, the FTO inlet BTU content and LP flare header pressure in response to step-wise changes in the set point pressure of the second membrane separator in the process shown in FIGS. 1 and 2.

This example, which is summarized in FIG. 6, provides an illustration of the responses to a change in operation of the membrane recovery system of the process shown in FIGS. 1 and 2. The operational change starts with an adjustment in the set point of the second membrane separator 39 from 30 psig to 15 psig in 2 steps (30 to 20 to 15 psig). The set point of the membrane separator defines the pressure gradient to encourage separation of permeate and residue from the feed; at lower set point there is bigger pressure differential from feed supply to the set pressure. This results in more permeate flow from the separator 39 to line 40 (see line [a] in FIG. 6), an increase in the FTO inlet BTU content with a dynamic lag (slight delay of about 20 to 30 minutes, following a 1st order time constant) (see line [b] in FIG. 6), but no change to the LP flare header pressure (see line [c] in FIG. 6)—indicating all the additional vents are contained within the FTO.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for producing an olefin polymer, the process comprising:
   (a) polymerizing at least one olefin monomer in a polymerization reactor to produce a particulate polymer product containing unreacted monomer;
   (b) contacting the polymer product with an inert gas-containing stream in a stripping vessel under conditions effective to strip hydrocarbon impurities including unreacted monomer from the polymer product and produce a stripped particulate polymer product and a gaseous first effluent stream containing inert gas and hydrocarbons;
   (c) recovering the stripped particulate polymer product;
   (d) compressing and cooling the first effluent stream to condense some of the hydrocarbons contained therein and produce a gaseous second effluent stream;
   (e) contacting at least part of the second effluent stream with a first membrane separator to produce a first permeate stream enriched in hydrocarbons as compared to the second effluent stream and a first residue stream depleted in hydrocarbons as compared to the second effluent stream;
   (f) contacting at least part of the first residue stream with a second membrane separator to produce a second permeate stream enriched in hydrocarbons as compared to the first residue stream and a second residue stream depleted in hydrocarbons as compared to the first residue stream; and
   (g) continuously supplying at least part of the second permeate stream and an oxidizing agent to a flameless thermal oxidation unit to convert hydrocarbons therein to $CO_2$ and $H_2O$.

2. The process of claim 1, the at least one olefin monomer comprises ethylene and/or propylene.

3. The process of claim 1, wherein the inert gas comprises nitrogen.

4. The process of claim 1, wherein at least part of the first permeate stream is recycled to the polymerization reactor.

5. The process of claim 1, wherein at least part of the second residue stream is recycled to (b) as part of the inert gas-containing stream.

6. The process of claim 1, wherein a separate fuel gas is supplied in a controlled and variable amount to the flameless thermal oxidation unit in (g).

7. The process of claim 6, wherein the separate fuel gas comprises natural gas.

8. A process for producing an olefin polymer, the process comprising:
   (a) polymerizing at least one olefin monomer in a polymerization reactor to produce a particulate polymer product containing unreacted monomer;
   (b) contacting the polymer product with an inert gas-containing stream in a stripping vessel under conditions effective to strip hydrocarbon impurities including unreacted monomer from the polymer product and produce a stripped particulate polymer product and a gaseous first effluent stream containing inert gas and hydrocarbons;
   (c) recovering the stripped particulate polymer product;
   (d) compressing and cooling the first effluent stream to condense some of the hydrocarbons contained therein and produce a gaseous second effluent stream;
   (e) contacting part of the second effluent stream with one or more membrane separators to produce a hydrocarbon-enriched permeate stream and a hydrocarbon-depleted residue stream; and
   (f) continuously supplying at least part of the permeate stream and an oxidizing agent to a flameless thermal oxidation unit to convert hydrocarbons therein to $CO_2$ and $H_2O$.

9. The process of claim 8, the at least one olefin monomer comprises ethylene.

10. The process of claim 8, wherein the inert gas comprises nitrogen.

11. The process of claim 8, wherein part of the hydrocarbon-depleted residue stream is recycled to step (b) as part of the inert gas-containing stream.

12. The process of claim 8, wherein part of the hydrocarbons removed from the second effluent stream in (e) are combined with the polymer product supplied to the stripping vessel in (b).

13. The process of claim 8 wherein step (e) comprises:
   (i) contacting part of the second effluent stream with a first membrane separator to produce a first permeate stream enriched in hydrocarbons as compared to the second effluent stream and a first residue stream depleted in hydrocarbons as compared to the second effluent stream; and (ii) contacting at least part of the first residue stream with a second membrane separator to produce a second permeate stream enriched in hydrocarbons as compared to the first residue stream and a second residue stream depleted in hydrocarbons as compared to the first residue stream, and wherein at least part of the second permeate stream is supplied to the flameless thermal oxidation unit in step (f).

14. The process of claim 8, wherein a separate fuel gas is supplied in a controlled and variable amount to the flameless thermal oxidation unit in (f).

15. The process of claim 14, wherein the separate fuel gas comprises natural gas.

16. The process of claim 8, wherein the permeate stream is compressed in a compressor having and inlet and an outlet before being fed to the flameless thermal oxidation unit and a variable portion of the compressed permeate stream exiting the outlet of the compressor is recycled to the compressor inlet according to the pressure at said inlet.

* * * * *